United States Patent [19]

Yamauchi

[11] 3,753,250

[45] Aug. 14, 1973

[54] CYLINDRICAL MAGNETIC DOMAIN PROPAGATING CIRCUIT AND LOGIC CIRCUIT

[75] Inventor: Fumio Yamauchi, Tokyo, Japan

[73] Assignee: Nippon Electric Company Limited, Tokyo-to, Japan

[22] Filed: Jan. 25, 1972

[21] Appl. No.: 220,665

[30] Foreign Application Priority Data

Feb. 1, 1971 Japan ............................46/3876

[52] U.S. Cl... 340/174 TF, 340/174 SR, 307/88 LC

[51] Int. Cl. G11c 11/14, G11c 19/00, H03k 19/168

[58] Field of Search ................ 340/174 TF, 174 SR, 340/307–88 LC

[56] References Cited

UNITED STATES PATENTS

| | | | |
|---|---|---|---|
| 3,633,185 | 1/1972 | Danylchuk | 340/174 TF |
| 3,651,496 | 3/1972 | Danylchuk et al. | 340/174 TF |

OTHER PUBLICATIONS

IBM Technical Disclosure Bulletin, "Bubble Domain Logic Inverter" by Almasi et al.; Vol. 13, No. 6, 11/70; p. 1581, 1582.

IBM Technical Disclosure Bulletin, "Combination AND/OR Logic Device" by Genovese; Vol. 13, No. 6, 11/70; p. 1522, 1523.

IBM Technical Disclosure Bulletin, "AND/OR Combinatorial Bubble Domain Logic Device" by Almasi et al.; Vol. 13; No. 6; 11/70; p. 1410.

*Primary Examiner*—Stanley M. Urynowicz, Jr.
*Attorney*—Richard C. Sughrue, Darryl Mexic et al.

[57] ABSTRACT

A cylindrical magnetic domain propagating and logic circuit capable of retaining and propagating domains in response to a rotating magnetic field, in which the propagating and logic circuit comprises an arrangement of Y-shaped patterns of thin film soft magnetic material. The Y-shaped patterns have various size strokes and are positioned to effect various logic functions depending on the particular positions of the Y-shaped patterns and the relative size of the strokes.

4 Claims, 7 Drawing Figures

CYLINDRICAL MAGNETIC DOMAIN PROPAGATING CIRCUIT AND LOGIC CIRCUIT

BACKGROUND OF THE INVENTION

The present invention relates to a cylindrical magnetic domain (bubble domain) propagating circuit and a logic circuit for use in magnetic memories and magnetic logic circuits of an information handling system such as electronic computers. More particularly, the invention relates to a cylindrical magnetic domain propagating circuit using a thin film pattern of soft magnetic material for the purpose of propagating or shifting the magnetic domain, and to a cylindrical magnetic domain logic circuit for performing various logic operations.

It has been known in the art that a cylindrical magnetic domain is produced in the single crystal thin sheet made of magnetic materials such as rare earth orthoferrites and magnetoplumbites, when a uniform static magnetic field of suitable value is applied perpendicular to the sheet. It has been also known that the domain is propagated along a magnetic field gradient when a non-uniform field is applied to the sheet. Since the diameter of such domain is so small, it has become possible to realize a large capacity, and high density magnetic memory element. Also, it has become possible to realize a new logic element utilizing the phenomenon of magnetic repulsion produced between cylindrical domains. These facts are described in "IEEE TRANSACTION ON MAGNETICS," Vol. MAG-5, No. 3, September issue, Pages 554–557.

One of the best known methods for providing the magnetic field graident for causing the domain propagation is to utilize soft magnetic material thin film. As one example of this method, as shown in FIG. 3 of the cited reference, soft magnetic material thin film is formed into T-shaped and I-shaped patterns by evaporated deposition process; the film is magnetized by an external rotating magnetic field; and the cylindrical magnetic domain is moved by the non-uniform magnetic field produced in the film. By adopting this method, various logic circuits and memory circuits can be realized by suitably arranging the thin film T-shaped and I-shaped patterns of magnetic material.

Another example of the prior art circuits is shown in FIG. 3A of the U.S. Pat. No. 3,534,347 issued on Oct. 13, 1970. In this patented system, thin film I-shaped patterns of soft magnetic material are disposed with a certain predetermined gradient to one another, and an external rotating magentic field is applied to magnetize the magnetic films as in the case of the first example to move the magnetic domain.

According to these prior art methods as exemplified by FIG. 3A or 5A of the U.S. Pat. No. 3,534,347, undesired magnetizations (more specifically, the magnetizations appearing in the area lying apart from C1 line) unrelated to the proparation of magnetic domain are inevitably caused. As a result, the superfluous magnetizations serve to expand and subsequently to prevent the movement of the magnetic domain when the applied static field is at a low level. To solve this problem, the position where the undesired magnetizations occur must be far apart from the position (line C1) where the magnetic domain is propagated. This consideration results in an adverse limitation on attempts at increasing the density of a memory element using magnetic domains. When viewed as a logic circuit, the prior art methods also have disadvantages. To remove the effect of the undesirable magnetizations, a complicated circuit configuration is required in the prior art.

It is, therefore, one object of this invention to provide a high density cylindrical magnetic domain propagating circuit and a structurally simple logic circuit free from the above-mentioned disadvantages of the prior art circuits.

SUMMARY OF THE INVENTION

Briefly, the feature of this invention resides in the use of a plurality of Y-shaped patterns which consist of soft magnetic material thin film disposed at predetermined intervals, and which have three projections forming 120° angle with one another. Thus, the invention makes it possible to dispense with the superfluous magnetizations in the propagation of the magnetic domain, and to realize the cylindrical magnetic domain propagating circuit having a high density and a structurally simple logic circuit.

The cylindrical magnetic domain propagating circuit and logic circuit of this invention comprises: a sheet of magnetic material capable of retaining cylindrical magnetic domains; means for applying a magnetic field substantially perpendicular to the sheet so as to maintain the magnetic domains; means for generating a magnetic field rotating within a plane of the sheet; and a cylindrical magnetic domain propagating means including a plurality of Y-shaped patterns of soft magnetic material thin film having Y-shaped strokes, said strokes forming angles of substantially 120° between them, and the Y-shaped patterns being disposed on the sheet so that magnetic variation is caused in succession in the Y-shaped patterns depending on the rotating magnetic field, thereby making the magnetic domains propagate in the sheet in a predetermined direction.

DETAILED DESCRIPTION OF THE INVENTION

Figure 1:
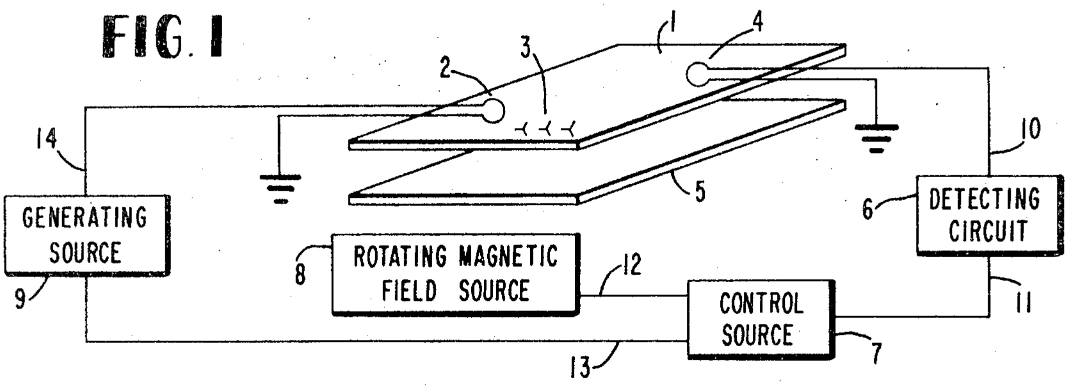
FIG. 1 shows a schematic diagram of the circuit of this invention.

In FIG. 1 which shows a schematic structure of a cylindrical magnetic domain propagating circuit and logic circuit of this invention, the circuit comprises: a sheet 1 of magnetic material capable of retaining cylindrical magnetic domains; a cylindrical magnetic domain generating section 2 disposed on the sheet 1; a cylindrical magnetic domain detecting section 4; a cylindrical magnetic domain propagating means 3 disposed between the generating section 2 and the detecting section 4; a magnet 5 for providing a static magnetic field which holds magnetic domains on the sheet 1; a cylindrical magnetic domain driving source 8 for providing a rotating magnetic field for the domain propagating means 3; a cylindrical magnetic domain detecting circuit 6; a cylindrical magnetic domain generating source 9; a control source 7 for controlling the domain driving source 8 and the domain generating source 9; and signal lines 10, 11, 12, 13 and 14.

This circuit structure is the same as that shown in the U.S. Pat. No. 3,534,347 except for the domain propagating means 3.

A principal feature of the present invention lies in the improvements in the domain propagating patterns which construct the domain propagating means 3 and which consist of soft magnetic material thin film formed in contact with the sheet 1 for performing the domain propagation and logic operations.

Figure 2:
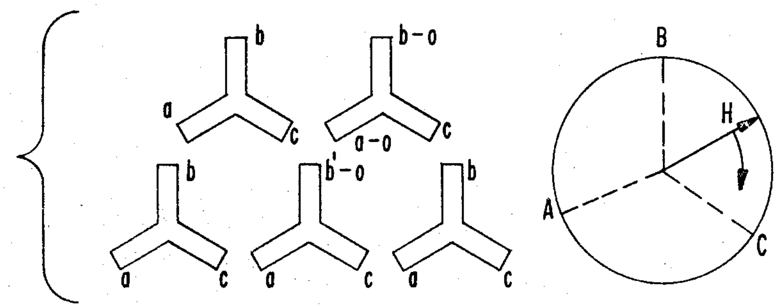
FIG. 2 shows a diagram of principal features of this invention.

FIG. 2 shows a diagram for explaining the features of the invention.

In FIG. 2, the reference letter H denotes a rotating magnetic field which rotates in the direction indicated by an arrow (clockwise), A → B → C. When the field H rotates to the directions A, B and C sequentially, the Y-shaped magnetic material thin film patterns are magnetized in the order of *a* → *b* → *c*, respectively. Therefore, the domain in the sheet 1 of magneitc material moves to the positions *a–b–c–a* . . . on the Y-shaped patterns depending on the rotating magnetic field H. It is assumed that the rotating magnetic field H is in the direction A, and that a domain is in a position *a–o*. In this state, when the field H rotates to the direction B, the position where the domain in the position *a–o* can be stable for the further propagation is either a position *b–o* or a position *b′–o*. The selection of the positions where the domain occupies depends upon the difference berween the distance from the position *a–o* to the position *b–o* and the distance from the position *b′–o* to the position *a–o* (namely, the difference between the magnetic field produced by magnetization due to the position *b–o* and that due to the position *b′–o*). For this reason, if the projection *b′–o* of Y-shaped pattern is made short enough, the domain is moved toward the position *b–o*. In contrast, if the stroke *b′–o* is extended and the distance from *b′–o* to the position *a–o* is made short enough in comparison with the distance from the position *b–o* to the position *a–o*, the domain is moved toward position *b′–o*. Thus, according to this invention, the domain propagating direction can be easily controlled by changing the length of the strokes of Y-shaped patterns. Consequently, the structure of logic circuit can be simplified in the manner as will be described later.

Figure 3:
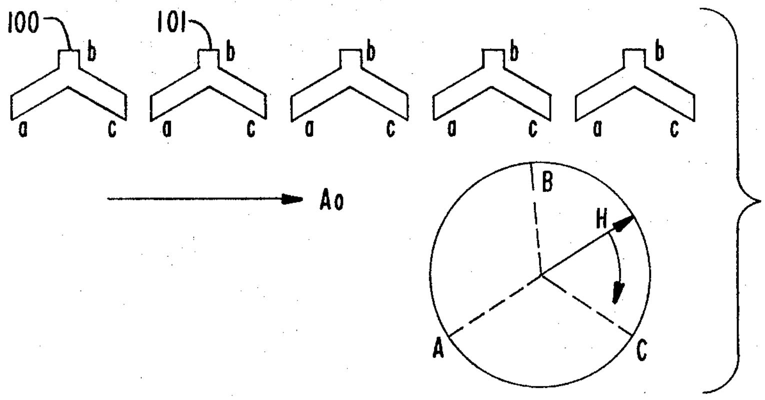
FIG. 3 shows a diagram of the first embodiment of this invention.

In FIG. 3 which shows a diagram of the first embodiment of this invention using the arrays of Y-shaped magnetic thin film patterns for moving the domain toward a predetermined direction, one projection (stroke) *b* of each Y-shaped pattern is shorter than two other strokes, having the same stroke length, and the longer strokes are adjacently aligned with one another. A cylindrical magnetic domain in contact with a part of the soft magnetic material film is moved in the direction *a* → *b* → *c* . . . according to the magnetization variation in the soft magnetic material thin film by the rotation of the rotating magnetic field H. The domain presents at a position *c* of Y-shaped pattern 100 that can move subsequently to either position *a*, at the right position or left position. However, as shown in FIG. 3, the distance between the position *c* and the position *a* of Y-shaped pattern 100 is far greater than that between the position *c* of Y-shaped pattern 100 and the position *a* of Y-shaped pattern 101. As a result, the domain is moved to the Y-shaped pattern 101. In this manner, the domain is propagated in the direction indicated by an arrow A*o* by way of *a* → *b* → *c* . . . Compared with the art yhown in shown 3A or 5A of the cited U.S. Pat. No. 3,534,347, it is apparent that undesirable magnetizations are not present in the propagation of the domain according to the teaching of this invention.

Figure 4:
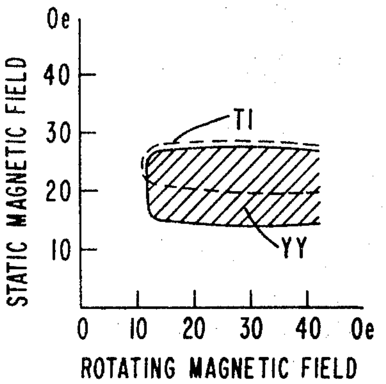
FIG. 4 shows a graph representing the comparison of the static magnetic field margin in the TI pattern of prior arts and that in the YY patterns of this invention.

FIG. 4 shows a graph for illustrating the regions in which the domain is stably propagated when the rotating magnetic field and static field are used as parameters. More specifically, the graph represents the above-mentioned regions of YY patterns of this invention and TI patterns of the prior arts in the U.S. Pat. No. 3,534,347. The sample used is composed of $YFeO_3$ having about 60$\mu$ (microns) thickness which was formed by the floating zone method and which was bonded to patterns of Permalloy thin film having about 1$\mu$ (micron) thickness deposited on glass. As is apparent from the drawing, the YY patterns of this invention makes a far wider static magnetic field margin available than the TI pattern of the prior arts.

Figure 5:
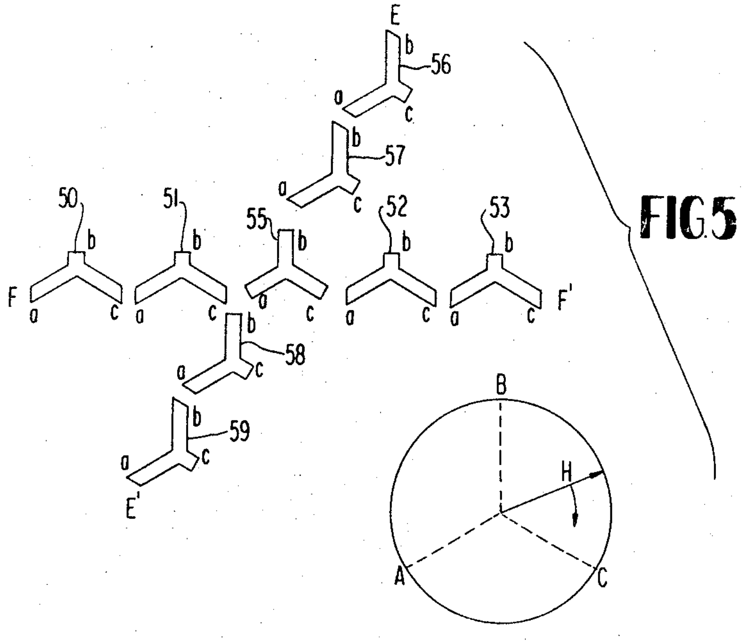
FIG. 5 shows a diagram of the second embodiment of the invention.

In the application of cylindrical magnetic domains, it has been proposed in the arts that a number of cylindrical magnetic domain elements are installed in the same static magnetic field, to obtain a large capacity memory or logic device. This proposal is mentioned, for example, in "SCIENTIFIC AMERICAN," September issue, 1971, Page 90. As a practical matter, the region where the domain stably exists depends on the thickness of the sheet of magnetic material capable of retaining magnetic domains. This fact is shown in FIG. 5, Page 1142, "JOURNAL OF APPLIED PHYSICS," Vol. 41, No. 3, published March 1970. For this reason, to realize a large capacity memory or logic device in the arts, the thickness of the sheet must be kept constant. When the domain propagation margin is wider with respect to the static magnetic field, it becomes possible to loosen the limitation on the thickness of the sheet. Thus, a wide margin availability for YY patterns of the soft magnetic material film against static magnetic field has a significant meaning in the manufacturing process of the large capacity stacked type device as mentioned in the "Scientific American."

In FIG. 5 which shows a diagram of the second embodiment of this invention, reference letters E and F represent cylindrical magnetic domain input terminals following cylindrical magnetic domain input positions (56, 57), and (50, 51) consisting of Y-shaped patterns. Reference letters E′ and F′ denote cylindrical magnetic domain output terminals following cylindrical magnetic domain detecting positions, or in other words, cylindrical magnetic domain output positions (58, 59) and (52, 53) consisting of Y-shaped patterns.

The Y-shaped patterns 56, 57, 58 and 59 form a first array similar to that of FIG. 3. In addition, the Y-shaped patterns 50, 51, 52 and 53 form a second array having the same structure as the first array. Moreover, the input terminals E and F are connected to the cylindrical magnetic domain generating section 2 (FIG. 1), and the output terminals E′ and F′ are connected to the cylindrical magnetic domain detecting section 4 (FIG. 1). The intersection of E–E′ and F–F′ consists of one Y-shaped pattern indicated by the numeral 55 which has three almost equal strokes. A cylindrical magnetic domain entering this intersection rotates on the Y-shaped pattern 55 without moving to adjacent patterns in the absence of a repelling force. Assuming that another domain comes in via the input terminal E, the domain is being moved to a position b of Y-shaped pattern 55 from a position a of Y-shaped pattern 57 at the moment the clockwise rotating magnetic field H is directed to the direction B after its two revolutions. On the other hand, the previous domain in the Y-shaped pattern 55 also tends to move from the position *a* to *b*. Under this condition, the two domains repel each other, and only the domain from point *a* on pattern 57 moves to position *b* of Y-shaped pattern 55. The other domain previously in the Y-shaped pattern 55 moves to a position *b* of Y-shaped pattern 58. Thus, the previous domain is pushed out of pattern 55 to the Y-shaped pattern 58. This domain appears at the terminal E', after two more rotations of the rotating magnetic field H. The other domain remains rotating on the Y-shaped pattern 55.

When another domain appears under this state via another input terminal F, the field is directed to the direction A, and the domain on the pattern 55 and the domain in a position *c* of Y-shaped pattern 51 moving to the position *a* of pattern 55 repel each other, after the two revolutions of the field H. In the vicinity of the previous domain on the pattern 55, a stroke *a* of Y-shaped pattern 52 is disposed. Thus, the domain previously on pattern 55 is pushed out toward stroke a of pattern 52 and subsequently appears at the output terminal F'. Similarly, when domains come in from the input terminals E and F simultaneously, these domains intersect with each other in the Y-shaped pattern 55. Such domain intersection serves to perform complicated logic operation.

Figures 6, 7:
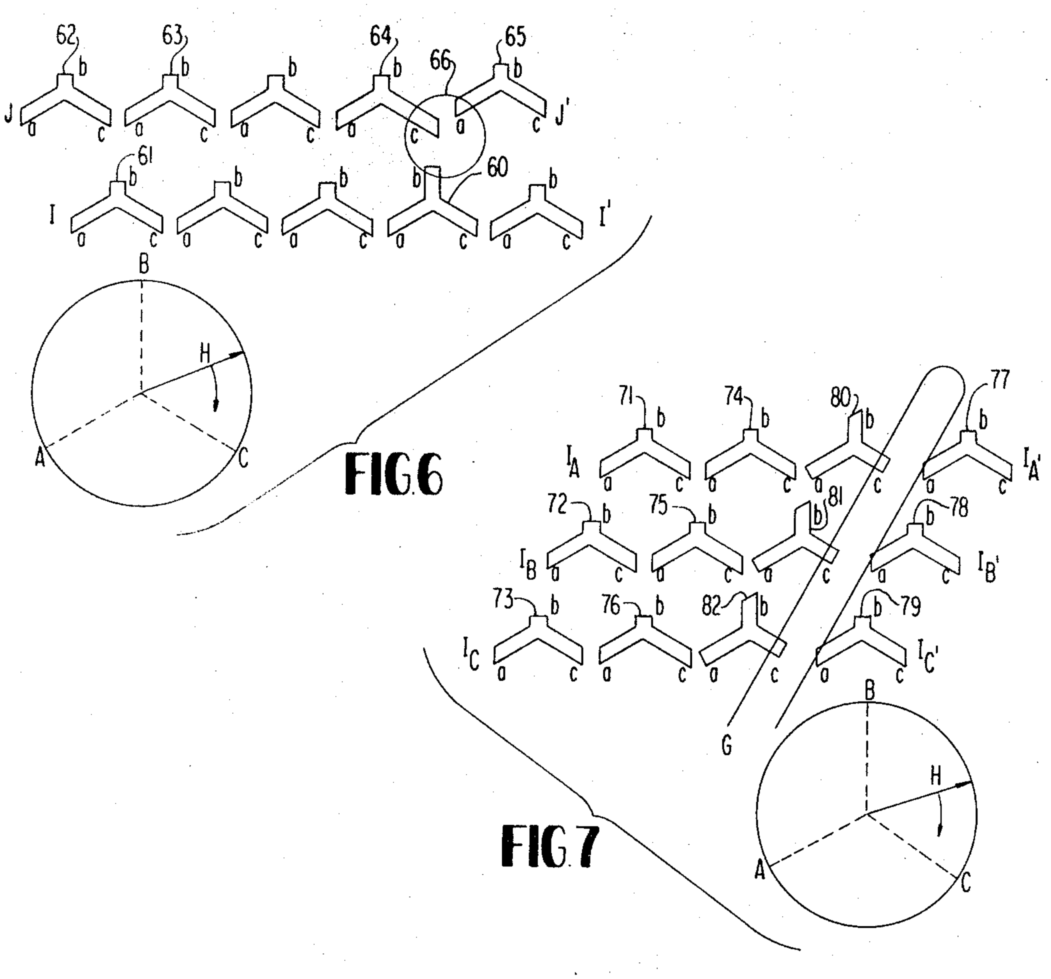
FIG. 6 shows a diagram of the third embodiment of the invention.
FIG. 7 shows a diagram of the fourth embodiment of the invention.

FIG. 6 shows a diagram of the third embodiment of the invention applied to AND and OR logic circuits using Y-shaped pattern array of soft magnetic material thin film.

In FIG. 6, reference letters J and I denote cylindrical magnetic domain input terminals connected to the domain generating section 2 (FIG. 1), and J' and I', cylindrical domain output terminals connected to the domain detecting section 4 (FIG. 1). A first array ranging from the input terminal I to the output terminal I' has the same structure as that shown in FIG. 3 except for a first particular Y-shaped pattern 60 at the predetermined position in the first array. The first particular Y-shaped pattern 60 has a stroke *b* shorter than the other two strokes *a* and *c* which are longer than corresponding ones in other Y-shaped patterns in the first array and shorter than the longest ones in the other Y-shaped patterns in the first array. A second array ranging from the input terminal J to the output terminal J' has the same structure as that shown in FIG. 3 except for a second particular Y-shaped pattern 64 having the longest stroke compared with corresponding one in each pattern of the second array, and a third particular Y-shaped pattern 65 disposed at an upper position for the other Y-shaped patterns 62, 63 and 64 in the second array and having the same strokes as the Y-shaped patterns 62, 63 and 65. As a result, the shorter stroke *b* of the first particular Y-shaped pattern 60 is closer to the longest one *c* of the second particular Y-shaped pattern 64. In addition, a stroke *a* of the third particular Y-shaped pattern 65 in the second array adjacent to the longest one *c* of the second particular Y-shaped pattern 64 is far from the shorter one *b* of the first particular Y-shaped pattern 60. Assuming that a domain enters via the input terminal J, the domain reaches a position *a* in the intersection indicated by the numeral 66 upon completion of four revolutions of the rotating magnetic field. Then, this domain comes out of the output terminal J' when another revolution of the field is completed. On the other hand, the domain coming in via the input terminal I enters a position b in the intersection 66 when the rotating magnetic field H is directed to the direction B at its fourth rotation. Furthermore, when the field H is directed to the direction C, the domain can go to either position *c* in the intersection 66 or position *c* on pattern 60. Normally, this domain is shifted to the position *c* in the intersection 66 because this position stands closer than the other position *c* with respect to the existing domain. Thus, the domain which entered at terminal I eventually appears at the output terminal J'. When two domains come in simultaneously via the input terminals I and J both the domains move toward the position *c* in the intersection 66 as soon as the rotating magnetic field H is directed to the direction C at its fourth revolution. However, since another position *c* in the Y-shaped pattern is sufficiently near stroke *b* of pattern 60, the domain from the input terminal I is pushed out to this position *c*. As a consequence, this domain is delivered to the output terminal I' after another revolution of the field H. Moreover, the domain from the input terminal J similarly goes out of the output terminal J' in the above-mentioned manner.

The operation of this logic circuit can be expressed in terms of *a* and 0 corresponding to the presence and absence of a magnetic domain, as shown in the following table.

| I | J | I' | J' |
|---|---|---|---|
| 1 | 0 | 0 | 1 |
| 0 | 1 | 0 | 1 |
| 1 | 1 | 1 | 1 |
| 0 | 0 | 0 | 0 |

The table shows that the output terminal I' corresponds to the output terminal of an AND circuit, and the output terminal J' to the output terminal of an OR circuit.

In FIG. 7 which shows a diagram of the fourth embodiment of the invention applied to a threshold logic circuit. The threshold logic circuit comprises: first arrays for cylindrical domain input positions having three cylindrical magnetic domain input terminals $I_A$, $I_B$ and $I_C$ and composed of a plurality of identical Y-shaped patterns 71, 72, 73, 74, 75 and 76; a second array for cylindrical magnetic domain detecting positions having three cylindrical magnetic domain output terminals $I_{A'}$, $I_{B'}$ and $I_{C'}$ and consisting of a plurality of Y-shaped patterns 77, 78 and 79 identical to those of the first arrays; a third array disposed between the first and second arrays and consisting of a plurality of identical Y-shaped patterns 80, 81 and 82 each having three stroke lengths different from those of each Y-shaped pattern of the first and second arrays; and a gate G made of a conductor for connecting the second and third arrays. The input terminals $I_A$, $I_B$ and $I_C$, and the output terminals $I'_A$, $I'_B$ and $I'_C$ are the same as those illusated in FIGS. 5 and 6. The conductor gate G is similar to that shown in FIG. 1, Page 447 of "IEEE TRANSACTION ON MAGNETICS," September issue, 1970, Vol. MAG-6, No. 3. In addition, the first arrays are constituted by three similar arrays (71, 74), (72, 75) and (73, 76) to that of FIG. 3. Also, the corresponding Y-shaped patterns in the first arrays and the third array form a row for performing a particular operation. For instance, the Y-shaped patterns (71, 74) in the first arrays and the Y-shaped pattern 80 in the third array constitute a row.

Assuming that a domain appears via the input terminal $I_A$, the domain moves from a position *c* of Y-shaped pattern 74 to a position *a* of Y-shaped pattern 80 when the clockwise rotating magnetic field H is directed toward the direction A after its two revolutions. Then, when the rotating magnetic field H is directed to the direction B, the domain moves to a position *b* of Y-shaped pattern 81. Also, when the field H is directed to the direction C, the domain moves to a position *c* of Y-shaped pattern 81. After this operation, the domain moves either to the position *a* of Y-shaped pattern 81 or to a position *a* of Y-shaped pattern 78 and then to the output terminal $I'_B$. In this embodiment, the position of Y-shaped patterns 81 and 78 and the lengths of the strokes are determined so that the domain in the position *c* of Y-bar pattern 81 will go to the position *a* of Y-shaped pattern 81 rather than to the position *a* of Y-shaped pattern 78. When the field rotates from direction A to direction B the domain moves to stroke *b* on pattern 82. The domain which has reached the Y-shaped pattern 82 next moves to a position *c* of Y-shaped pattern 82 depending on the further rotation of the field H. When the conductor gate G is opened under this state, the domain is propagated to a position *a* of Y-shaped pattern 79 following the output terminal $I'_C$, and delivered to the output terminal $I'_C$ when the field H completes another rotation.

When domains come in simultaneously via the input terminals $I_A$ and $I_B$, these domains move to the position *b* of Y-shaped pattern 91 and the of the position *b* of Y-shaped pattern 82 upon completion of 2 and ½ revolutions of the field H. Then, these domains reach the position a of Y-shaped pattern 81 and the position *a* of Y-shaped pattern 82, respectively. After this movement, the domain in the Y-shaped pattern 81 comes under the influence of the repulsion force exerted from the domain in the Y-shaped pattern 82 and cannot go to the position *b* of Y-shaped pattern 82. As a result, the two domains rotate around the Y-shaped patterns 81 and 82, respectively. When the gate G is opened at the time point of the arrival of the position *c* of Y-shaped patterns 81 and 82 again, these domains come out of the output terminals $I'_B$ and $I'_C$, respectively, upon completion of another revolution of the field H. When domains appear via the input terminals $I_A$, $I_B$ and $I_C$, simultaneously, these domains are propagated in the same manner as mentioned above. In this case, the domains go out of the output terminals $I'_A$, $I'_B$ and $I'_C$ at the same time.

Thus, with the array of YY patterns of soft magnetic material thin film of this invention, the logic circuit can be provided with great freedom and the capacity can be greatly increased.

While the invention has been particularly shown and described with reference to preferred embodiments thereof, it will be understood by those skilled in the art that various changes in form and detail may be made therein without departing from the spirit and scope of the invention.

What is claimed is:

1. A cylindrical magnetic domain propagating circuit and logic circuit comprising: a sheet of magnetic material capable of retaining cylindrical magnetic domains; means for applying a magnetic field substantially perpendicular to the sheet so as to maintain the magnetic domain; means for generating a magnetic field rotating within the plane of the sheet; and a cylindrical magnetic domain propagating means composed of a plurality of Y-shaped patterns of soft magnetic material thin film having three strokes forming a Y pattern, said strokes forming substantially 120° angles with one another, and the Y-shaped patterns being disposed on the sheet so that the magnetization sufficient to hold said domains moves from stroke to stroke in succession in the Y-shaped patterns in a direction depending on the rotating magnetic field, thereby making the magnetic domains propagate in the sheet toward a predetermined direction, said plurality of Y-shaped patterns comprises a group of successively positioned Y-shaped patterns each having one stroke shorter than the other two strokes, and the Y-shaped patterns being disposed recurrently so that said shorter strokes are parallel to each other and substantially perpendicular to the said direction of propagation and the longer strokes of each Y-shaped pattern are adjacently aligned with one another without any intervening magnetic thin film patterns between the adjacent long strokes of adjacent Y-shaped patterns.

2. A cylindrical magnetic domain propagating circuit and logic circuit as claimed in claim 1 wherein said plurality of Y-yhaped patterns further comprises a second group of Y-shaped patterns disposed to intersect with said first group and having the same structure as said first group array; and one Y-shaped pattern disposed at the intersection of said two groups and having all three strokes of equal length.

3. A cylindrical magnetic domain propagating circuit and logic circuit comprising: a sheet of magnetic material capable of retaining cylindrical magnetic domains; means for applying a magnetic field substantially perpendicular to the sheet so as to maintain the magnetic domain; means for generating a magnetic field rotating within the plane of the sheet; and a cylindrical magnetic domain propagating means composed of a plurality of Y-shaped patterns of soft magnetic material thin film having three strokes forming a Y pattern, said strokes forming substantially 120° angles with one another, and the Y-shaped patterns being disposed on the sheet so that the magnetization sufficient to hold said domains moves from stroke to stroke in succession in the Y-shaped patterns in a direction dpending on the rotating magnetic field, thereby making the magnetic domains propagate in the sheet toward a predetermined direction, said plurality of Y-shaped patterns comprises, a first group of successively positioned Y-shaped patterns having one stroke shorter than the other two strokes and being recurrently disposed so that the longer strokes of said patterns are adjacently aligned with one another, one of said first group constituting a first particular Y-shaped pattern having its shorter stroke longer than the short strokes of the other patterns in said first group, a second group of successively positioned Y-shaped patterns having one stroke shorter than the other two strokes and being recurrently disposed so that the longer strokes of said patterns are adjacently aligned with one another, one of said second group constituting a second particular Y-shaped pattern having one of its longs strokes longer than all other long strokes in said second pattern, and one of said second group constituting a third particular Y-shaped pattern adjacent to the longest stroke of said second particular Y-shaped pattern and displaced slightly above the other patterns in said second group, said third particular Y-shaped pattern having the same shape as all other patterns in said second group except for said second particular Y-shaped pattern, and said first and second groups being positioned relative to one another so that the end of the short stroke of said first particular Y-shaped pattern is closer to the end of said longest stroke of said second particular Y-shaped pattern than it is to the ends of its own long strokes, and the end of the short stroke of said first particular Y-shaped pattern is closer to the ends of its own long strokes than it is to that long stroke of said third particular Y-shaped pattern which is adjacent to the longest stroke of said second particular Y-shaped pattern.

4. A cylindrical magnetic domain propagating circuit and logic circuit comprising: a sheet of magnetic material capable of retaining cylindrical magnetic domains; means for applying a magnetic field substantially perpendicular to the sheet so as to maintain the magnetic domain; means for generating a magnetic field rotating within the plane of the sheet; and a cylindrical magnetic domain propagating means composed of a plurality of Y-shaped patterns of soft magnetic material thin film having three strokes forming a Y pattern, said strokes forming substantially 120° angles with one another, and the Y-shaped patterns being disposed on the sheet so that the magnetization sufficient to hold said domains moves from stroke to stroke in succession in the Y-shaped patterns in a direction depending on the rotating magnetic field, thereby making the magnetic domains propagate in the sheet toward a predetermined direction, said plurality of Y-shaped patterns comprises at least two rows of Y-shaped patterns disposed near and in parallel relation to each other, each group comprising successively positioned Y-shaped patterns, all but one of which has one stroke shorter than the other two strokes and all except said one being of substantially the same shape, and said longer strokes aligned adjacently with one another, said one exception in each row having three stroke lengths different from those in said other Y-shaped patterns, and being disposed in said rows, respectively, in corresponding position, whereby a domain held at one stroke of said one exception in said first row will tend to move to a stroke of said one exception in said second row when said rotating field rotates and in the absence of a repelling force to prevent such movement.

* * * * *

UNITED STATES PATENT OFFICE

CERTIFICATE OF CORRECTION

Patent No. 3,753,250 Dated August 14, 1973

Inventor(s) FUMIO YAMAUCHI

It is certified that error appears in the above-identified patent and that said Letters Patent are hereby corrected as shown below:

Column 7

Line 21, delete "Y-bar" and insert --Y-shaped--

Line 35, delete "91" and insert --81--

Signed and sealed this 9th day of April 1974.

(SEAL)
Attest:

EDWARD M.FLETCHER,JR.
Attesting Officer

C. MARSHALL DANN
Commissioner of Patents